Sept. 9, 1924.  
L. MICHAELSON  
MOTION SIGNAL AND REAR VIEW LIGHT FOR MOTOR VEHICLES  
Filed Oct. 11, 1923   2 Sheets-Sheet 1

1,508,112

Witnesses:

L. Michaelson,
Inventor

By
Attorney

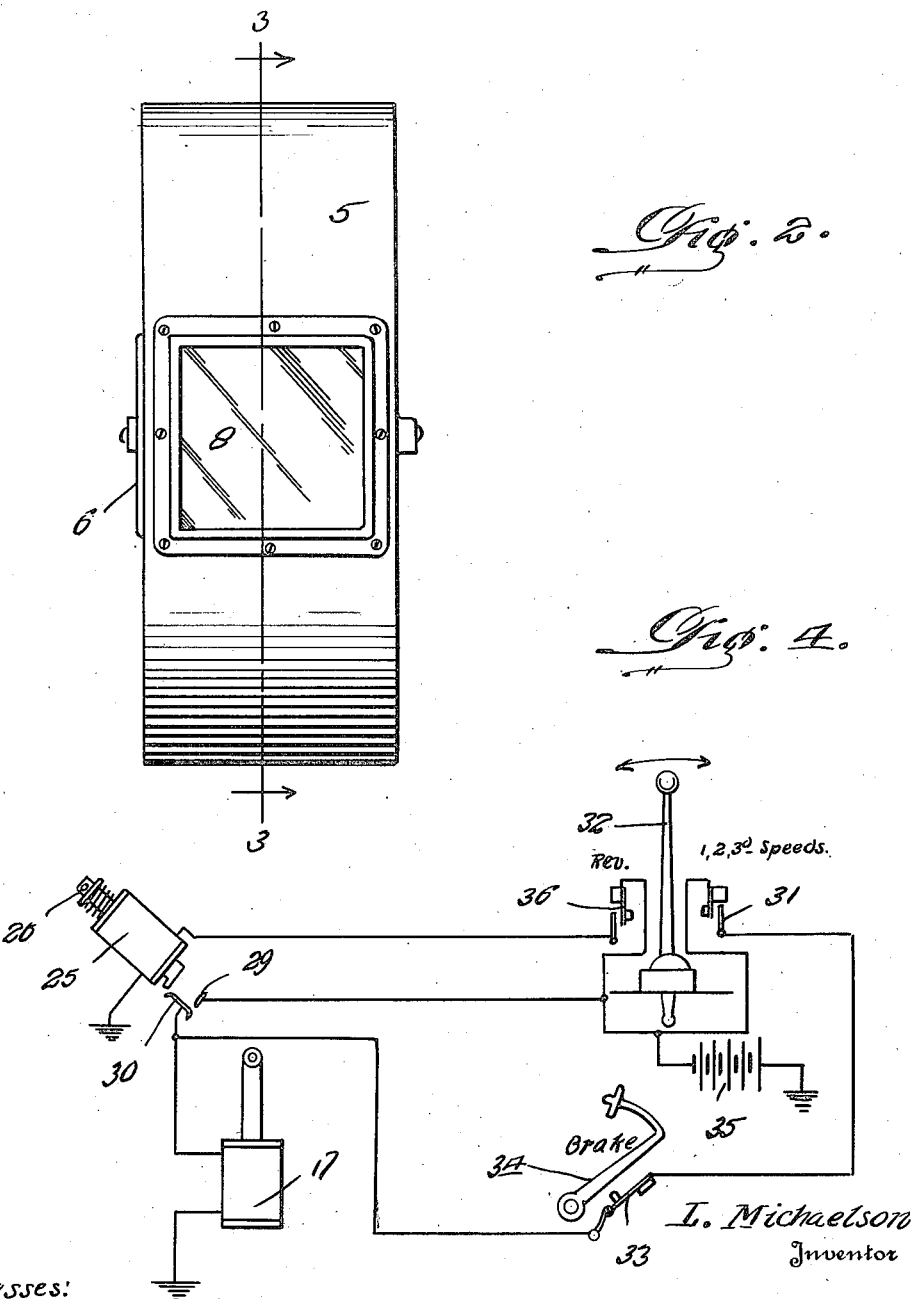

Patented Sept. 9, 1924.

1,508,112

UNITED STATES PATENT OFFICE.

LEANDER MICHAELSON, OF DOLLAR BAY, MICHIGAN.

MOTION-SIGNAL AND REAR-VIEW LIGHT FOR MOTOR VEHICLES.

Application filed October 11, 1923. Serial No. 667,951.

*To all whom it may concern:*

Be it known that I, LEANDER MICHAELSON, citizen of the United States, residing at Dollar Bay, in the county of Houghton and State of Michigan, have invented certain new and useful Improvements in Motion-Signal and Rear-View Lights for Motor Vehicles, of which the following is a specification.

This invention relates to a certain new and useful motor vehicle accessory, and has particular reference to a motion signal and rear view light by means of which the driver of a vehicle may notify drivers of approaching vehicles that he is about to bring the vehicle to a stop, or whether or not such vehicle is in motion, and whereby, when backing, a clear vision or view will be had in back of the vehicle.

The primary object of the invention is to provide a device of the above kind which embraces the desired qualities of simplicity, durability, and efficiency in operation.

Another object of the invention is to provide an apparatus of the above kind, which is substantially automatic in its action, as well as reliable and efficient in operation.

A further object is to provide a motion signal and rear view light, which comprises a minimum number of parts of simple construction, whereby the device may be cheaply and easily manufactured, and will not readily get out of order.

Other objects will appear as the nature of the invention is better understood, and the same consists in the novel form, combination, and arrangement of parts hereinafter more fully described, shown in the accompanying drawings, and claimed.

In the drawings, wherein like reference characterers indicate corresponding parts throughout the several views:

Figure 2 is a rear elevational view thereof.

Figure 4 is a diagrammatic view illustrating the wiring and switch arrangement that may be employed for placing the signal in use.

Referring more in detail to the drawings, the present invention embodies a circular casing 5 having flat side walls, one of which is provided with an opening provided with a transparent closure plate, as at 6, through which light may shine, at all times, from an incandescent lamp 7 that is mounted within the casing 5 and supported by the other side wall thereof. The casing 5 is provided in its cylindrical wall with another opening that is closed by means of a transparent closure plate 8, and through which the light from the connecting lamp 7 may also continuously pass.

Figure 1:
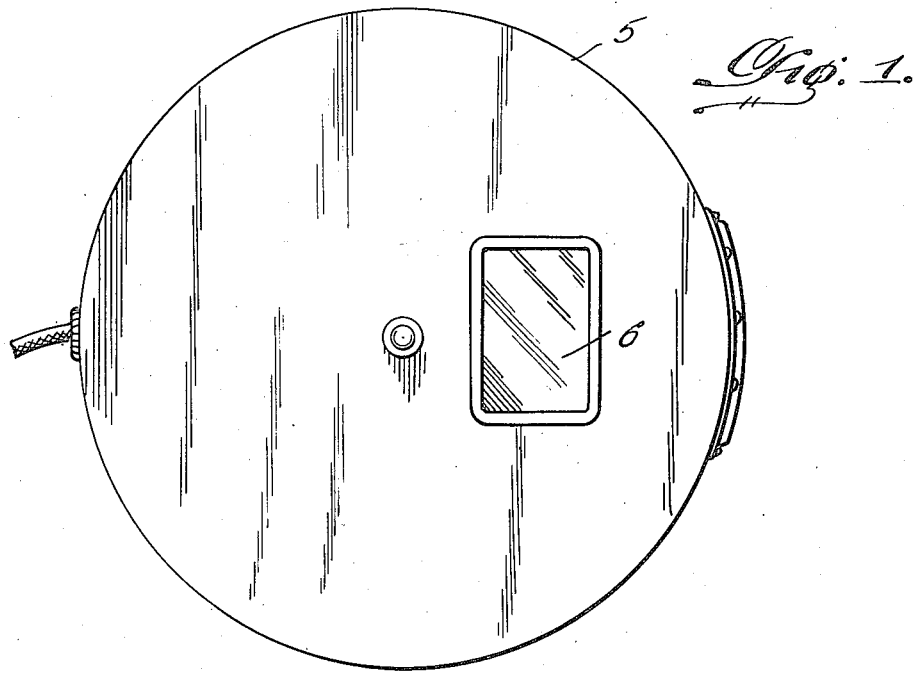
Figure 1 is a side elevational view of a combined motion signal and rear view light constructed in accordance with the present invention.
Figure 3:
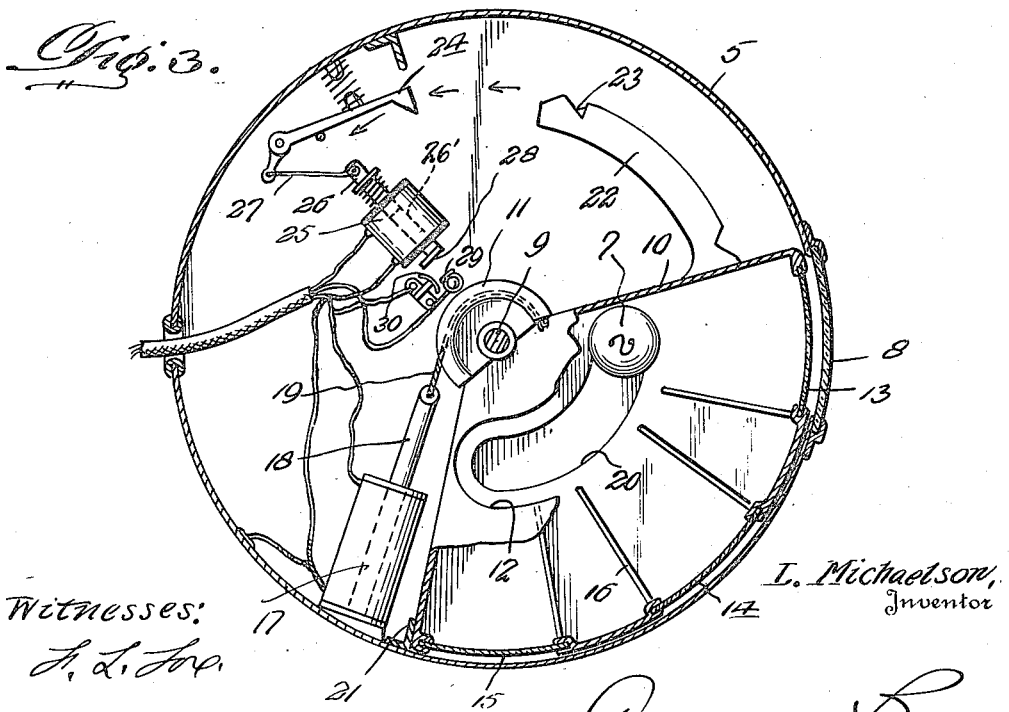
Figure 3 is a longitudinal sectional view, taken substantially upon the line 3—3 of Figure 2.

Supported by the sides of the casing 5 and arranged centrally of the latter is a transverse shaft 9 which carries a swinging segmental signal element 10 that is provided at the juncture of the flat surfaces with a pulley segment 11 which is concentric with the shaft 9. The segmental signal element 7 is of hollow form and arranged with its curved wall concentric with and disposed adjacent the inner sides of the cylindrical wall of the casing 5 as shown in Figure 3, and one side wall of this hollow signal element 7 is provided with a slot as at 12 through which the light from the incandescent lamp 7 may pass at all times to and through the transparent plate 6. The arcuate or curved wall of the segmental signal element 10 is formed with three openings, each of which is closed by means of a glass panel or the like, the panel 13 in the upper opening being of red color, the panel in the intermediate opening as at 14, being preferably of green color, and the lower panel 15 being of clear glass or white.

The interior of the segmental signal element 7 is divided into a plurality of light chambers by means of radial partitions 16 positioned at opposite sides of each of the panels 13, 14 and 15 as shown in Figure 3.

A solenoid 17 is mounted in the bottom of the casing 5 and has the upper end of its core 18 attached to a flexible member 19 that passes over the pulley segment 11 and has its other end attached to said pulley segment, whereby when the core 18 is drawn downwardly or attracted upward swinging movement is imparted to the signal element 7 so as to move the red panel 13 out of register with the plate 8 and to bring a desired one of the panels 14 or 15 in register therewith, in a manner and for a purpose which will presently become apparent. In order to permit this swinging movement of the element 10, a slot 20 is provided opposite the slot 12 or in the other side wall of said element so that the lamp 7 will not interfere with the same. The movement of the signal element 10 downwardly under the influence of gravity, is limited by a suitable stop 21 carried by the casing 5 to a point wherein the red panel 13 is aligned with the transparent plate 8 of the casing so that a danger signal light is normally displayed when the lamp 7 is illuminated.

The upper end of the signalling element 10 is provided with an arcuate bar 22 having a pair of spaced notches 23 in the upper edge thereof, one of which is arranged to be engaged by a spring pressed pawl or catch 24 when the signal element is swung upwardly to retain the latter in position with the green panel 14 registering with the plate 8 of the casing.

A second solenoid 25 is supported by the casing above the pulley segment 11, and has the upper end of its core 26 operatively connected as at 27 to the catch 24 in such manner that when said solenoid 25 is energized, the catch 24 is swung out of the path of the notched bar 22 for permitting, at this time, sufficient upward movement of the signal element 10 to register the white or clear glass panel 15 with the transparent plate 8 of the casing. The lower end of the core 26 as indicated at 26', as formed of a section of non-magnetic material, and is provided with a contact bridging element 28 adapted to bridge a pair of contacts 29 and 30 that are carried by the casing beneath the solenoid 25 when the core 26 is drawn downwardly or attracted for releasing the catch 24.

Referring to Figure 4, the solenoid 17 is arranged in a circuit containing a normally open switch 31 that is adapted to be operatively associated with the gear shift mechanism of a motor vehicle for being closed when the gear shift lever 32 is moved to either of its first, second, or third speed positions. This circuit also includes a normally closed switch 33 so associated with the brake pedal 34 of the vehicle as to be opened for breaking said circuit when the brake is applied. The contact 29 is connected to a source of electrical supply 35, such as the battery of a vehicle, and which is included in all of the circuits employed, and the contact 30 is in electrical connection with the winding of the solenoid 17. The solenoid 25 is included in a separate circuit containing a normally open switch 36 which is adapted to be so associated with the gear shift mechanism of the vehicle that when the gear shift lever 32 is moved to reverse gear position, this switch will be closed.

In describing the operation of the device, we will assume that the parts are in the positions shown in Figures 3 and 4 with the switches 31 and 36 open and the gear shift lever 32 in neutral position. At this time, the signalling element 10 is lowered with the red panel 13 in register with the transparent plate 8 of the casing so that a danger signal is displayed at the rear of the vehicle to indicate that the latter is not in motion. Upon placing the gear shift lever 32 in either of its forward speed positions, the switch 31 will be closed for energizing the solenoid 17 so as to cause upward swinging movement of the signal element 10 until the catch 24 engages in the notch of the bar 22 for arresting movement of said signal element at a position wherein the green panel 14 is in register with the panel 8 of the casing so that approaching drivers will be notified of the fact that the vehicle is in motion. Should the brake pedal 34 be applied when the gear shift lever is positioned for closing the switch 31, the circuit of the solenoid 17 will be broken so as to allow the signal element 10 to again lower and display a danger signal for advising approaching drivers of the fact that the vehicle is about to stop. When the gear shift lever 32 is moved to a position wherein the vehicle is caused to move backwardly, the switch 36 is closed, so as to energize the solenoid 25 and first swing the catch 24 out of the path of the bar 22 for permitting swinging movement of the signal segment 10 upward to its extreme position wherein the white or clear colored panel 15 is in register with the transparent plate 8 of the casing. As soon as the catch 24 is moved out of the path of the bar 22, the contacts 29 and 30 are bridged by the bridging element 28 of the core 26 for completing a circuit through the solenoid 17 whereby the latter may cause this upward swinging movement of the signal element. When this operation is completed, a clear light is thrown in the rear of the vehicle so that the driver may readily see any obstruction in his path. The white light will be displayed until the gear shift lever is moved from the reverse gear position thereof for deenergizing the solenoid 17 and allowing the signal element 10 to again lower under the influence of gravity. Obviously, by suitable supporting of the license plates at a side of the casing 5 they will be illuminated by the lights passing thru the transparent panel 6 of the casing.

From the foregoing description, it is believed that the construction and operation as well as the advantages of the present invention will be readily understood and appreciated by those skilled in the art.

Minor changes may be made without departing from the spirit and scope of the invention as claimed.

What I claim as new is:

In a motion and rear view signal for motor vehicles, a casing, a segmental hollow signal element pivotally mounted for vertical swinging movement within the casing, a solenoid mounted within the casing and operatively connected to said signal element for raising the latter, latch means normally operative to arrest upward swinging movement of the signal element to an intermediate motion indicating position, a second solenoid within the casing operatively connected to said latch means for releasing the latter to allow the signalling element to swing to its extreme upper position, means to cause illumination in the rear of the vehicle upon movement of said signal element to its uppermost position, means operated by the second named solenoid upon energizing the same for completing the circuit to said first named solenoid, said first named solenoid being included in a circuit embodying a normally opened switch adapted to be closed upon movement of the gear shift lever of a motor vehicle to any of its forward speed positions, the circuit of said first named solenoid further including a normally closed switch adapted to be opened upon operation of the brake applying pedals of the motor vehicle, said second named solenoid included in a circuit including a normally opened switch which is adapted to be closed upon movement of the gear shift lever to reverse gear position.

In testimony whereof I affix my signature.

LEANDER MICHAELSON.